US005159668A

United States Patent [19]

Kaasila

[11] Patent Number: 5,159,668

[45] Date of Patent: Oct. 27, 1992

[54] METHOD AND APPARATUS FOR MANIPULATING OUTLINES IN IMPROVING DIGITAL TYPEFACE ON RASTER OUTPUT DEVICES

[75] Inventor: Sampo Kaasila, Cupertino, Calif.

[73] Assignee: Apple Computer, Inc., Cupertino, Calif.

[21] Appl. No.: 348,703

[22] Filed: May 8, 1989

[51] Int. Cl.[5] .............................................. G06F 15/72

[52] U.S. Cl. .................................... 395/151; 395/150; 340/747; 340/750

[58] Field of Search ........................ 364/518, 521, 522; 340/721, 734, 747, 728, 706; 395/141, 142, 143, 139, 150, 151

[56] References Cited

U.S. PATENT DOCUMENTS 4,675,830 6/1987 Hawkins ............................ 364/518

4,823,282 4/1989 Yamagami .......................... 364/518

4,829,446 5/1989 Draney ............................... 364/488

*Primary Examiner*—Gary V. Harkcom

*Assistant Examiner*—Phu K. Nguyen

*Attorney, Agent, or Firm*—Blakely, Sokoloff, Taylor & Zafman

[57] ABSTRACT

In a computer system with a raster output device, a method for manipulating the outlines of a symbol image at various sizes such that the outline defines a close representation of the symbol image. A plurality of control points which correspond to an outline of the symbol image are stored in a memory of the computer system. The size of the symbol image which is to be output on the raster device is determined. The computer system then determines, given the size of the symbol image, whether the control points of the outline of the symbol must be adjusted in order to provide a proper display of the symbol. If adjustment is warranted, at least one of the control points for the outline is selected. The selected control points are then displaced by a predetermined amount to form a new outline of the symbol image. This adjusted outline is then stored in the computer system's memory and may be output in the raster device. The rearrangement of the outline of the symbol provides for a more uniform visual display of the symbol regardless of its size.

12 Claims, 11 Drawing Sheets

FIG 11

| INPUT RANGE | OUTPUT RANGE |
|---|---|
| 0 | −8 |
| 1 | −7 |
| 2 | −6 |
| 3 | −5 |
| 4 | −4 |
| 5 | −3 |
| 6 | −2 |
| 7 | −1 |
| 8 | 1 |
| 9 | 2 |
| 10 | 3 |
| 11 | 4 |
| 12 | 5 |
| 13 | 6 |
| 14 | 7 |
| 15 | 8 |

METHOD AND APPARATUS FOR MANIPULATING OUTLINES IN IMPROVING DIGITAL TYPEFACE ON RASTER OUTPUT DEVICES

The present application has been filed concurrently with and is related to U.S. patent application, Ser. No. 07/348,806, filed May 8, 1989, and hereby refers to an incorporates by reference the contents of the above-referenced application.

BACKGROUND OF THE INVENTION

1. Field of the Invention

The present invention relates to the field of digital typography. In particular, the present invention enables font-rendering engines to render high quality digital typefaces for displaying on low raster output devices.

2. Background of Prior Art

Existing digital font-rendering techniques on computers can be classified into three categories: (1) bitmap type, (2) algorithmic type, and (3) outline type.

Bitmap rendering techniques are the most direct way to display fonts as ultimately all fonts must be realized as bitmaps in the raster output devices such as printer or CRT. Here, fonts are described and manipulated as explicit bitmaps. However, such techniques consume a sizable amount of the computer's memory. (For example, see U.S. Pat. No. 4,029,947). Given the large variety of typefaces, selection of point sizes, and infinite choice of resolutions, bitmap rendering techniques are awkward to store and manipulate.

Algorithmic rendering techniques describe and specify typefaces with algorithmic programs. Such programs could be parametric, enabling font designers and developers to change a design via parameters each time the program is executed.

Outline rendering techniques describe and manipulate typefaces as outlines. A compact representation of font results from the use of splines to record and regenerate the shape of curves. Splines are curves that are controlled by a small set of given control points and tangents. Some manufacturers of outline fonts in the world use a system based on the principles of IKARUS. See Peter Karow, *Digital Formats for Typefaces*, (URW Verlag, 1987). Outline font-rendering techniques create outlines from digitized input of typefaces and convert outlines automatically to equivalent bitmap forms for output to raster output device, such as a printer or CRT. Representing idealized design by outlines not only obviates large memory storage but also permits interactive editing by the font designer.

Nevertheless, outlines do not render perfect characters at all sizes. Most outline font renderers are based on data structures which assume pre-defined steps in controlling outlines. A few outline font formats have primitives. Primitives are basic methods to control outlines, such as correcting the height of typefaces. The smaller number of pixels at low raster resolution makes it difficult to match fonts of different size and resolution. It is noted that most of the raster output devices in current use, such as CRT and draft printers, are of the low raster resolution category. As such, it is important to improve the resulting bitmap of typefaces at low raster resolution.

It is, therefore, an objective of the present invention to improve the outline control of font renderers at low raster resolution.

SUMMARY OF THE INVENTION

The present invention provides methods and apparatus which are most advantageously used in conjunction with a digital computer to provide improved font rendering capability. These techniques permit font rendering engines to improve font display at low raster resolution. A font is a collection of glyphs which generally have some element of consistency in their appearance (e.g. serifs, or stroke thickness). A glyph is a graphical depiction which usually represents a character, symbol, or other textual object. An outline font is a compact way to represent glyphs on digital computer by creating outlines from control points on the glyphs.

In accordance with one typical embodiment of the present invention, there is provided means for accepting an input representation of outlines of a font, which may be comprised of alphanumericals, non-Roman based characters, or any arbitrary symbols. This input representation is most advantageously coupled to a digital computer. Once received, a control program within the computer memory displays the outlines on an appropriate device, such as a CRT, of the selected glyph. Font instructions incorporating scaling, interpolating, and grid-fitting techniques are available for a user to produce outline of typefaces at various sizes and resolutions. Grid-fitting is the alignment of control points in a digital outline description to a grid and other manipulation of the position of control points for the purpose of facilitating scan conversion outputs.

Because outlines do not create perfect characters at all sizes (particularly smaller sizes), font rendering engines are restricted in their ability to enhance the resulting bitmap at low raster resolution.

Outline manipulation means are disclosed in the present invention for improving the font rendering engines' control over outlines of a glyph. Outline manipulation means are exceptions to other font rendering techniques: when properly structured, they move control points on the outlines of a glyph at specific raster resolution by one or multiple fractions of a pixel.

BRIEF DESCRIPTION OF THE DRAWINGS

FIG. 11. illustrates internal remapping table for Delta exception.

NOTATION AND NONMENCLATURE

Figure 1:
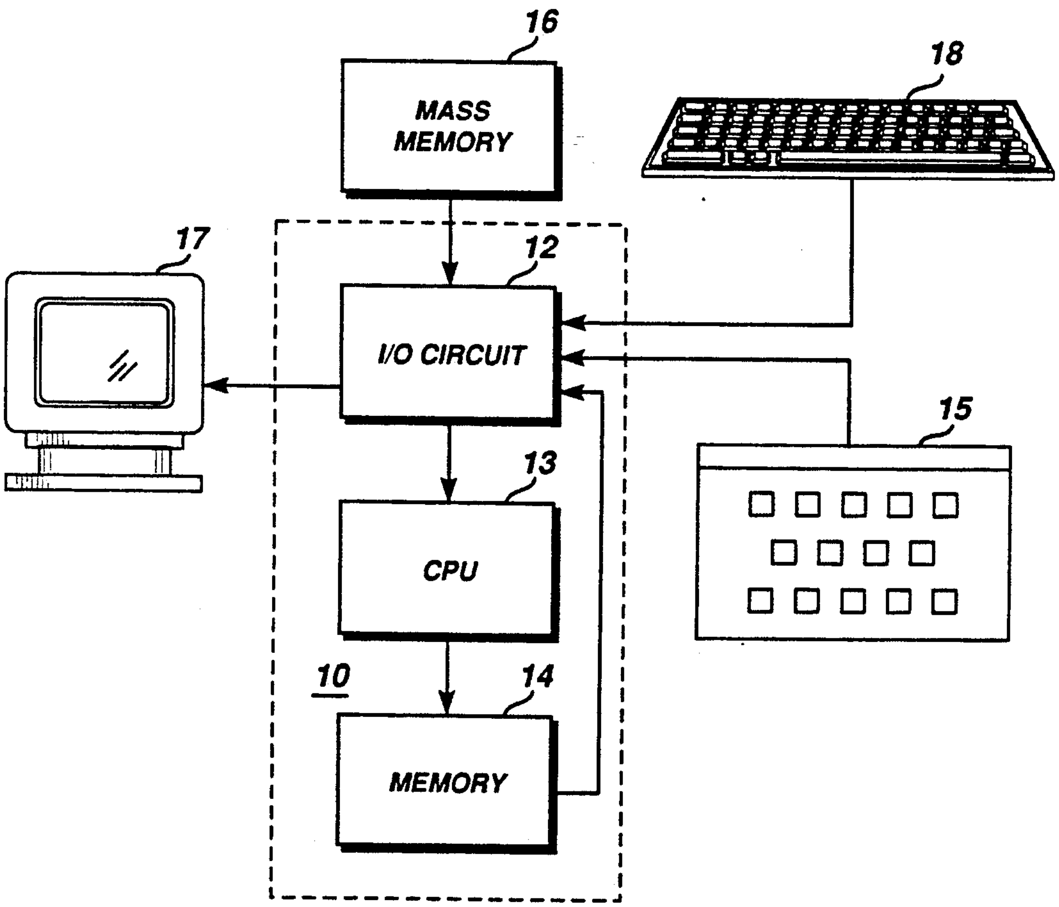
FIG. 1. illustrates a computer incorporating the present invention.

The detailed description which follows is presented largely in terms of algorithms and symbolic representations of operations on data bits and data structures within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulation of physical quantities. Usually, though necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulation performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

The following detailed description will be divided into several sections. The first of these will treat a general system arrangement for generating computer digital fonts. Subsequent sections will deal with the process of creating outlines of glyph, specifying a size and a resolution the glyph would be displayed, and the use of Delta exceptions to move control points by one or multiple fractions of a pixel when desired to improve the resulting bitmap. Finally a specific application of the use of Delta exceptions will be shown in connection with modifying a lowercase letter "o".

In addition, in the following description, numerous specific details are set forth such as algorithmic convention, specific numbers of bits, etc., in order to provide a thorough understanding of the present invention. However, it will be obvious to one skilled in the art that the present invention may be practiced without these specific details. In other instances, well-known circuits and structures are not described in detail in order not to obscure the present invention unnecessarily.

GENERAL SYSTEM CONFIGURATION

FIG. 1 shows a typical computer-based system for generating computer graphic images according to the present invention. Shown there is a computer 10 which comprises three major components. The first of these is the input/output (I/O) circuit 12 which is used to communicate information in appropritely structured form to and form the other parts of computer 10. Also shown as part of computer 10 is the central processing unit (CPU) 13 and memory 14. These latter two elements are those typically found in most general purpose computers and almost all special purpose computers. In fact, the several elements contained within computer 10 are intended to be representative of this broad category of data processors to fill the role of computer 10 included machines manufactured by the Apple Computer Co., Cupertino, Calif. Other computers having like capabilities may of course be adapted in a straightforward manner to perform the several functions described below.

Also shown in FIG. 1 is an input device 15, shown in typical embodiment as a keyboard. It should be understood, however, that the input device may actually be a card reader, magnetic or paper tape reader, or other well-known input device (including, of course, another computer). A mass memory device 16 is coupled to the I/O circuit 12 and provides additional storage capability for the computer 10. The mass memory may include other programs, fonts for given characters, and the like and may take the form of a magnetic or paper tape reader or other well known device. It will be appreciated that the data retained within mass memory 16, may, in appropriate cases, be incorporated in standard fashion into computer 10 as part of memory 14.

In addition, a display monitor 17 is illustrated which is used to display the images being generated by the present invention. Such a display monitor may take the form of any of several varieties of CRT displays. A cursor control 18 is used to select command modes and edit graphic data, such as for example a particular image, and provides a more convenient means to input information into the system.

Figure 2:
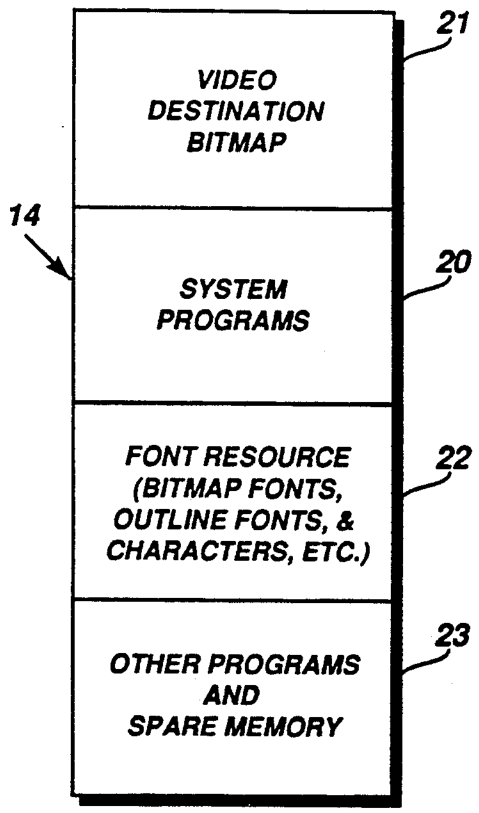
FIG. 2. shows a typical arrangement of program storage in the system of FIG. 1.

FIG. 2 shows a typical arrangement of the major programs contained within the memory 14 illustrated in FIG. 1. In particular, there is shown a video destination bitmap 21. This destination bitmap represents the video memory for the display monitor 17. Each bit in the destination bitmap corresponds to the upper left coordinate of a corresponding pixel on the display monitor. Thus, the destination bitmap can be described as a two-dimensional array of points having known coordinates. Of course, in the present case, where the display monitor is used in conjunction with a low raster output device such as a printer, the contents of the bitmap 21 would be the resulting bitmap and represent the data points to be displayed by the particular low resolution raster output device.

Memory 14 also include system program 20 which represent a variety of sequences of instructions for execution by the CPU. For example, the control programs such as the interpreter, scan converter, disk operating systems and the like may be stored within this memory location.

Font resource 22 contains bitmap fonts, outline fonts, coordinates and characters in memory 14 or may be stored temporarily in mass memory 16 as may be required in any given application of the present invention. Additionally, space within memory 14 is reserved for other programs and spare memory which is designated at 23. These other programs may include a variety of useful computational or utility programs as may be desired.

PROCESS OVERVIEW

The process of the present invention will be best understood in reference to the steps a font designer would go through in creating an outline font, in scaling a glyph to a smaller size, and in grid-fitting the outlines at low raster resolution.

Below are some units of measurement commonly used in the field of digital typography that are helpful in relating quantity and quality expressed herein. The size of a type is measured in points. An inch has about 72 points. The resolution of an raster output device is expressed in dots per inch (dpi). Laser printers typically have a resolution of 240 to 400 dip, while CRTs have a resolution of 50 to 200 dpi. To express a size of a type to be displayed in a particular raster output resolution, one uses Pixels per em (ppem). It is the product of size and resolution divided by the number of points in an inch.

Figure 3:
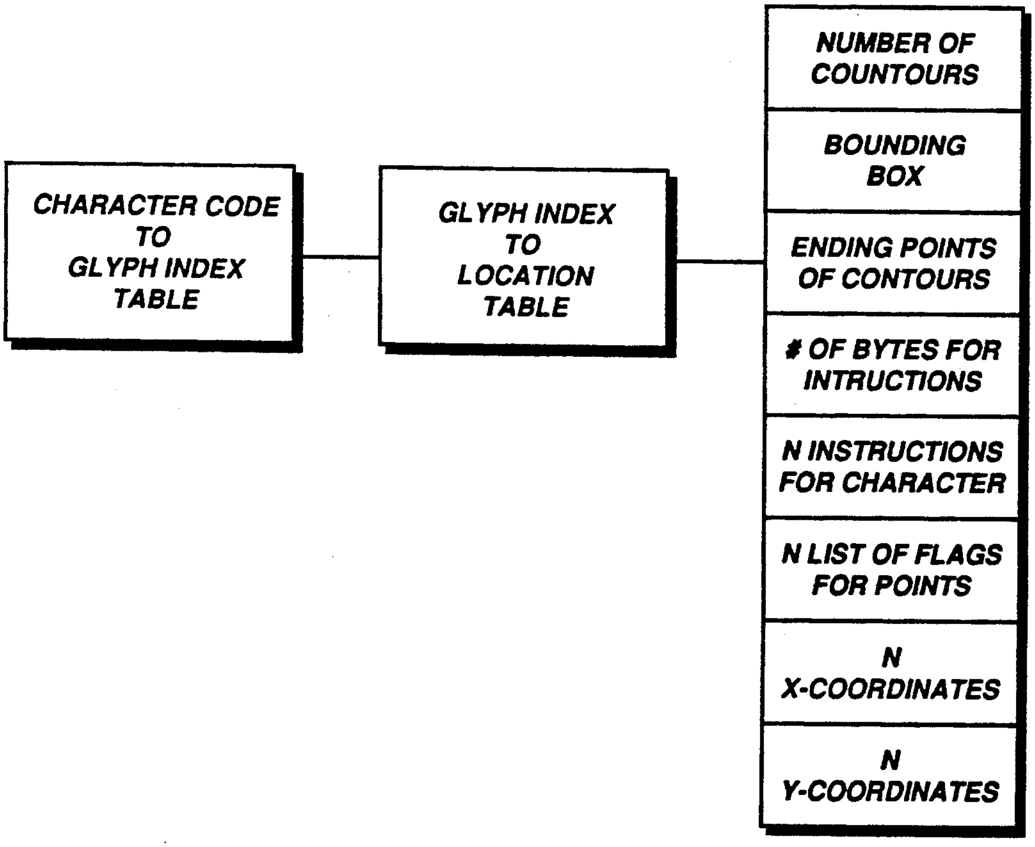
FIG. 3. illustrates a typical B-spline outline data structure for storing a glyph.

In FIG. 2, Font resouce 22 consists of a data structure which houses the actual outline fonts along with bitmap fonts and other standard character sets. A font designer would build an outline font by first describing and storing a glyph in an outline or spline format. 2nd order B-splines are an important class of spline because they provide good approximation to letterforms, are relatively fast computationally, and offer users control of both on-curve and off-curve control points. To specify the outlines of a glyph using 2nd order B-spline, one has to supply: (i) the number of outlines, (ii) last point of every contour, and (iii) a flag indicating if a control point is on or off the outline. Thus glyph are specified in the following format as provided by FIG. 3:

| Field | Bytes | Sign | Description |
|---|---|---|---|
| | 2 | Unsigned | Number of outlines |
| | 8 | Signed | Bounding box: x-min y-min; x-max; & y-max |
| | n | Unsigned | Endings points of outlines |
| | 2 | Unsigned | # of bytes used for instructions |
| | n | Unsigned | instruction for glyph |
| | n | Unsigned | list of flags for points |
| | n | Unsigned | x-coordinates |
| | n | Unsigned | y-coordinates |

The first starting point is expressed in terms of absolute x and y-coordinates, and is by definition always point 0 (zero). For all following outlines, the starting point is the ending point of the last outline plus one.

Figure 6:
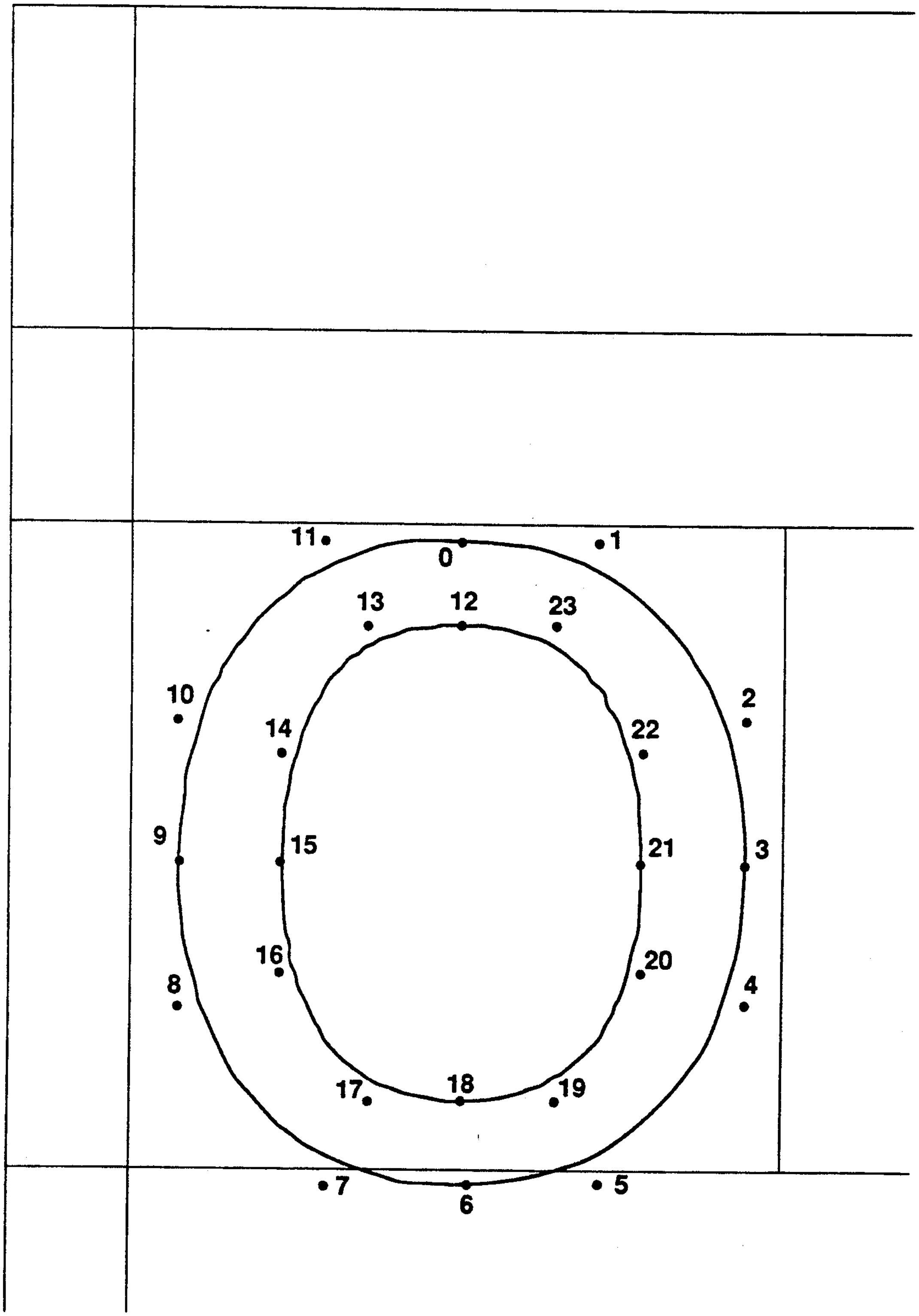
FIG. 6. illustrates B-spline outlines of a character with its control points at low raster resolution.

Applying the above format to our example in FIG. 6, we would have the following data structure:

| Characteristic | Number | Description |
|---|---|---|
| Number of outlines | 2 | The outside of letter "o" and inside of the same. |
| Bounding Box | x-min; y-min x-max; y-max | The four corners of a box bounding a glyph. |
| Ending points of | 11, 23 | The outline for the outside goes from 0-11 and the inside from 12-23. |
| # of bytes for instructions | n | This length specifies how many bytes are for instructions. |
| Instructions | n bytes | location of actual instructions to control a glyph. |
| List of flags | 24 flags for 24 points | |
| x-coordinates | 48 bytes for 24 points | Size smaller if compact method with flags is used. |
| y-coordinates | 48 bytes for 24 points | Size smaller if compact method with flags is used. |

Figure 4:
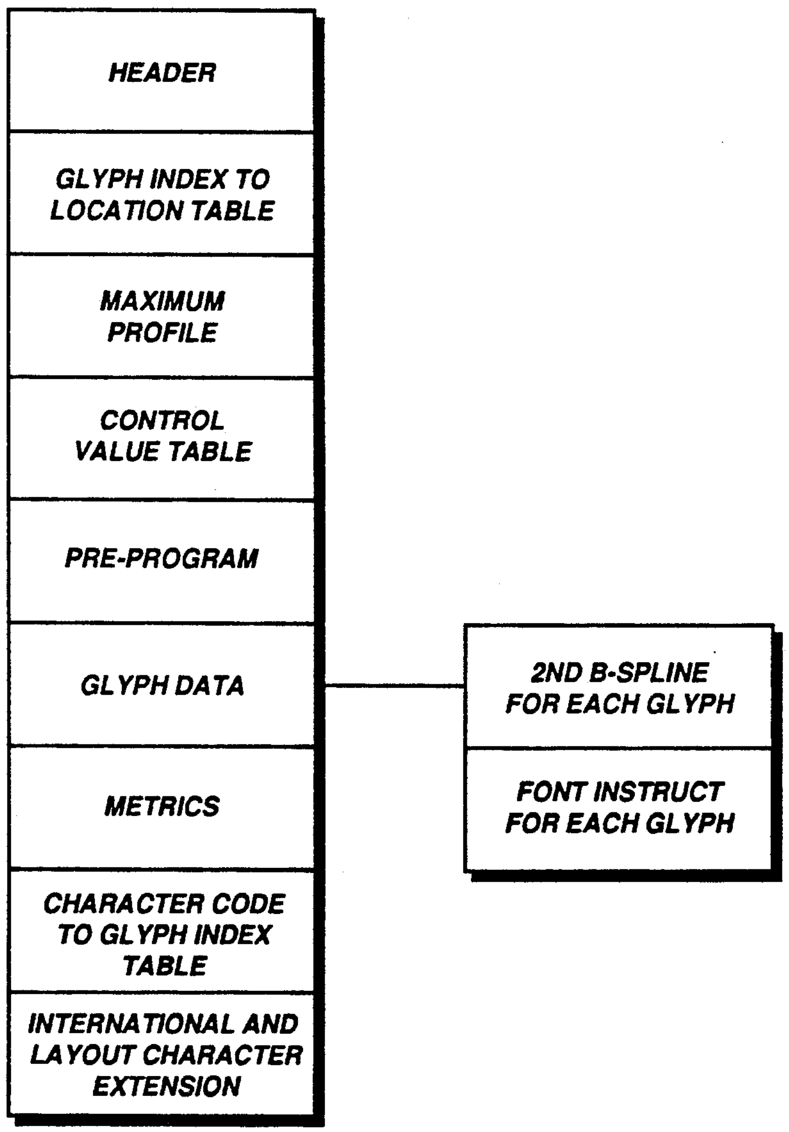
FIG. 4. illustrates a typical B-spline outline data structure for storing a font.

FIG. 4 illustrates a possible data structure for an outline font as a family of related glyphs is described and stored in the font resource. Of particular interest to the user are the Control Value Table and the Pre-Program. The Control Value Table comprises of a set of figures that can be used to set uniform sizes for different glyph or character elements. For instance, the following information may be stored:

Capital height (for rounded characters and flat ones) x-height ascender height (for rounded characters and flat ones) descender height (for rounded characters and flat ones) figure height overlaps (example: how much taller is a capital "O" than a capital "H")

width of character stems, etc.

The contents of the Control Value Table correspond to the basic units of measurement in the field of digital typography. X-height is the basic height of the lowercase letters "x", while ascender is that parts of the lowercase letters that reach above the x-height and descender is that parts that fall below the baseline. As such, instructions using values from the Control Value Table can scale glyphs to the appropriate point size.

The Pre-Program in FIG. 4 is a collection of instructions that modify the Control Value Table within the outline font. Whenever the user selects a new font or a new size in the same font, the Pre-Program is executed to modify the values in the Control Value Table. Similarly, the Pre-Program sets up the Graphic State of the interpreter before the user begins working with the new font or size. The Graphic State is divided into a local and global state. The local Graphic State does not have any inter-glyph memory, so it is fresh for each glyph. In contrast, the global Graphic State has inter-glyph memory and also stays in effect between the Pre-Program and the glyph.

Figure 5:
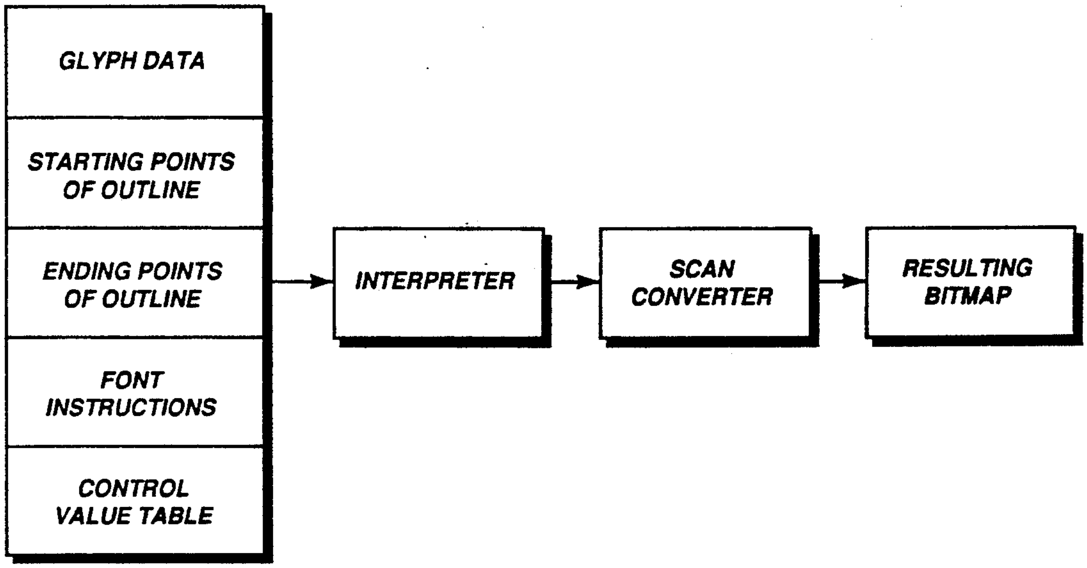
FIG. 5. illustrates a flow chart of the process of converting B-spline font data into digital typeface through a interpreter and scan converter.

FIG. 5 shows an interpreter and interpreter and scan converter. The input to the interpreter consists of the control points that make up a glyph, information describing the beginning and the end of the outlines, Pre-Program, font instructions, and the Control Value Table. The interpreter has a Graphic State which defines the context in which any of the font instructions operate. Through the use of font instructions; the grid-fitting of a glyph, regularization of text, and other operations upon the font are accomplished. The user can sequence the font instructions in any order, giving him a high degree of flexibility in controlling the font. The following is a synopsis of the various broad categories of font instructions among which users can select in rendering digital fonts:

| Function of Routines | # of Routines |
|---|---|
| Freedom and Projection Vectors | 10 |
| Internal and Character Element Pointers . | 7 |
| Modifying Internal Settings | 14 |
| Stack Manipulation | 7 |
| Interpolation and Shift Instructions | 7 |
| Moving Points | 8 |
| Reading and Writing Data | 11 |
| Relational and Logical Instructions | 11 |
| IF-Statements Instructions | 2 |
| Arithmetic and Math Instructions | 10 |
| Short Push Instructions | 2 |
| Function Calls | 4 |
| Delta Exceptions | 3 |
| Reading and Writing Metrics | 3 |
| Debugging Instructions | 1 |

The repertoire of font instructions coupled with the flexible approach to grid-fitting give users the freedom to render and to improve upon digital typefaces at low raster resolutions. In particular, the Delta exceptions discloses a novel method to move control points by one or multiple fractions of a pixel. The incremental adjustment at low raster resolution enables users to solve so-called "impossible" cases

SPECIFIC APPLICATION OF THE METHOD OF THE INVENTION

Having described in detail the general system configuration, the process and the terminology of the method of the invention, the applicant will now apply Delta exceptions to a specific example, namely the modification of an illustrative the lowercase letter "o" as shown in FIG. 6 through FIG. 11.

Referring now to the drawings, the scaled outlines of the original letter "o" is shown in FIG. 6. The letter has been scaled from size 2048 ppem to size 18 ppem. The outlines specifying the letter "o" comprise two continuous outlines—the outline 0–11 in the clockwise direction and outline 12–23 in the counter-clockwise direction. Control points in a 2nd order B-spline are either on or off the outline: for example, control points 0 and 3 are extrema for the spline between them and control points 1 and 2 are tangents and therefore off the spline curve.

Figure 7:
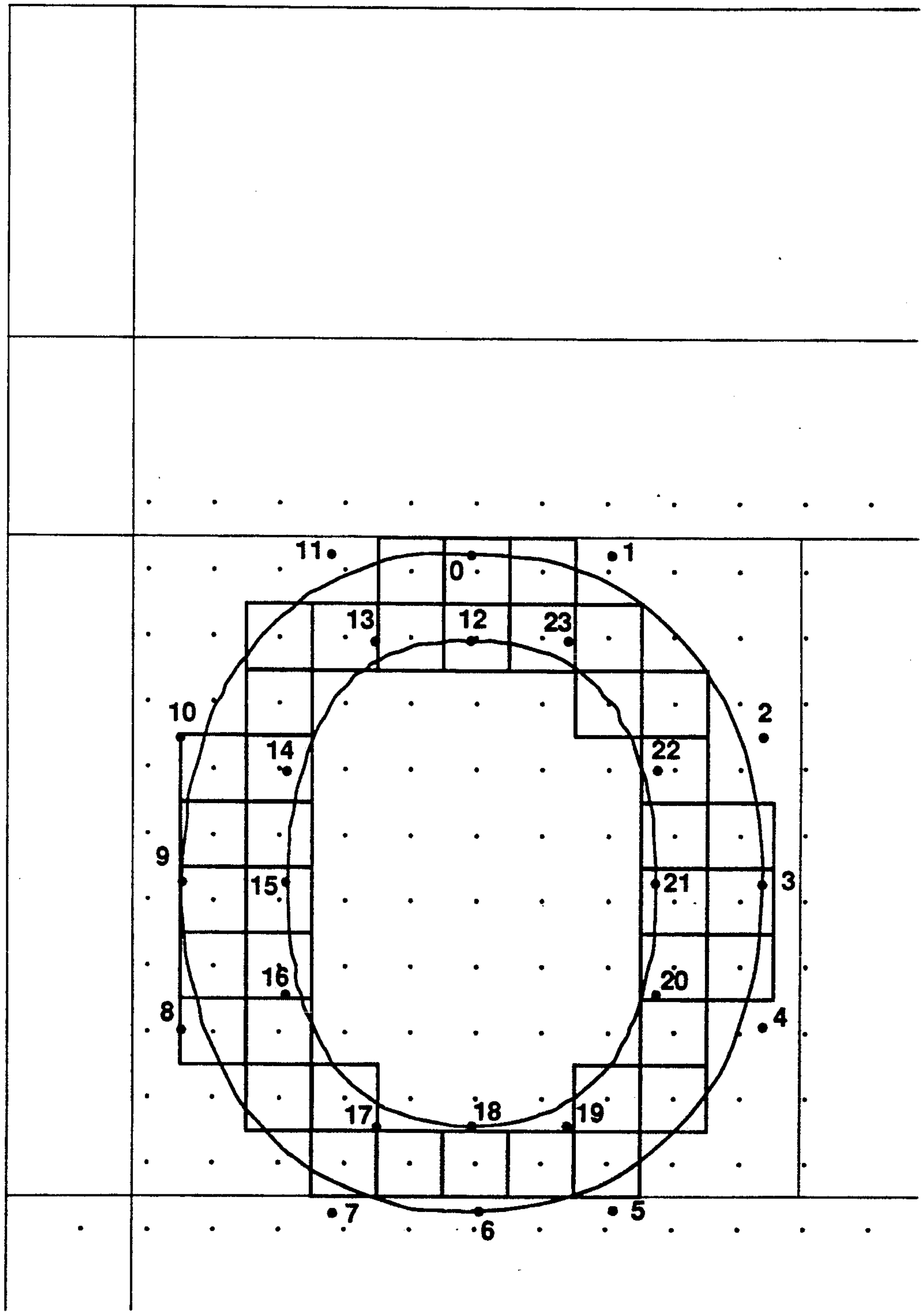
FIG. 7. illustrates B-spline outlines of a character at low raster resolution with its resulting bitmap superimposed thereon.

In FIG. 7 the resulting bitmap of the spline outlines of lowercase letter "o" is superimposed onto the outline. At (10×9) dots resolution, the resulting bitmap of the outline of the lowercase letter "o" is unsatisfactory. Not only is the bitmap asymmetrical, but also the vertical and horizontal portions of the bitmap are out of proportion with each other. This visual deterioration occurs because the control points of the outline do not always coincide with the discrete grid position corresponding to the resolution of the raster display device. Moreover, distortion due to small difference in height or width increases when scale of the typeface decreases.

Figure 8:
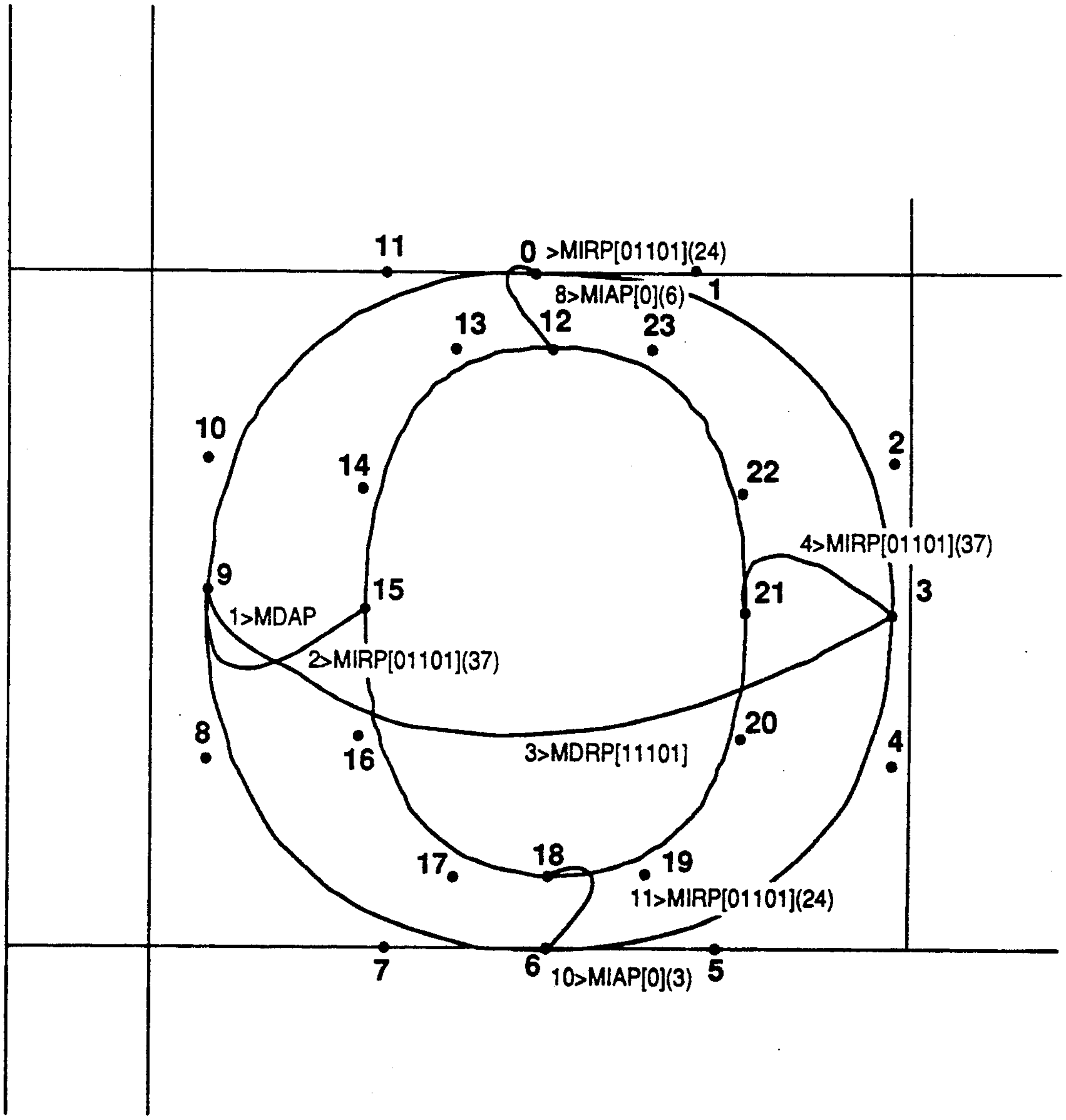
FIG. 8. illustrates an application of Delta exceptions on a character at low raster resolution to alter control points and outlines.

Referring to FIG. 8, font instructions have been applied to the spline outlines of the lowercase letter "o". The instructions are summarized as follows: (i) in the x-axis, move control point 9 left to the closest grid point by using MDAP instruction, (ii) fix a distance between control point 9 and control point 15, (iii) fix another distance between control 9 and control point 3 by using MDRP instruction, (iv) fix a distance between control point 3 and control point 21 similar to that between control points 9 and 15 in part (ii), (v) smooth all other control points untouched by the preceding font instructions, (vi) apply Delta exceptions, and (vii) repeat the preceding steps in a similar fashion in the y-axis. The font instructions and Delta exceptions for accomplishing the above are also disclosed in the upper portions of FIG. 8.

Figure 9:
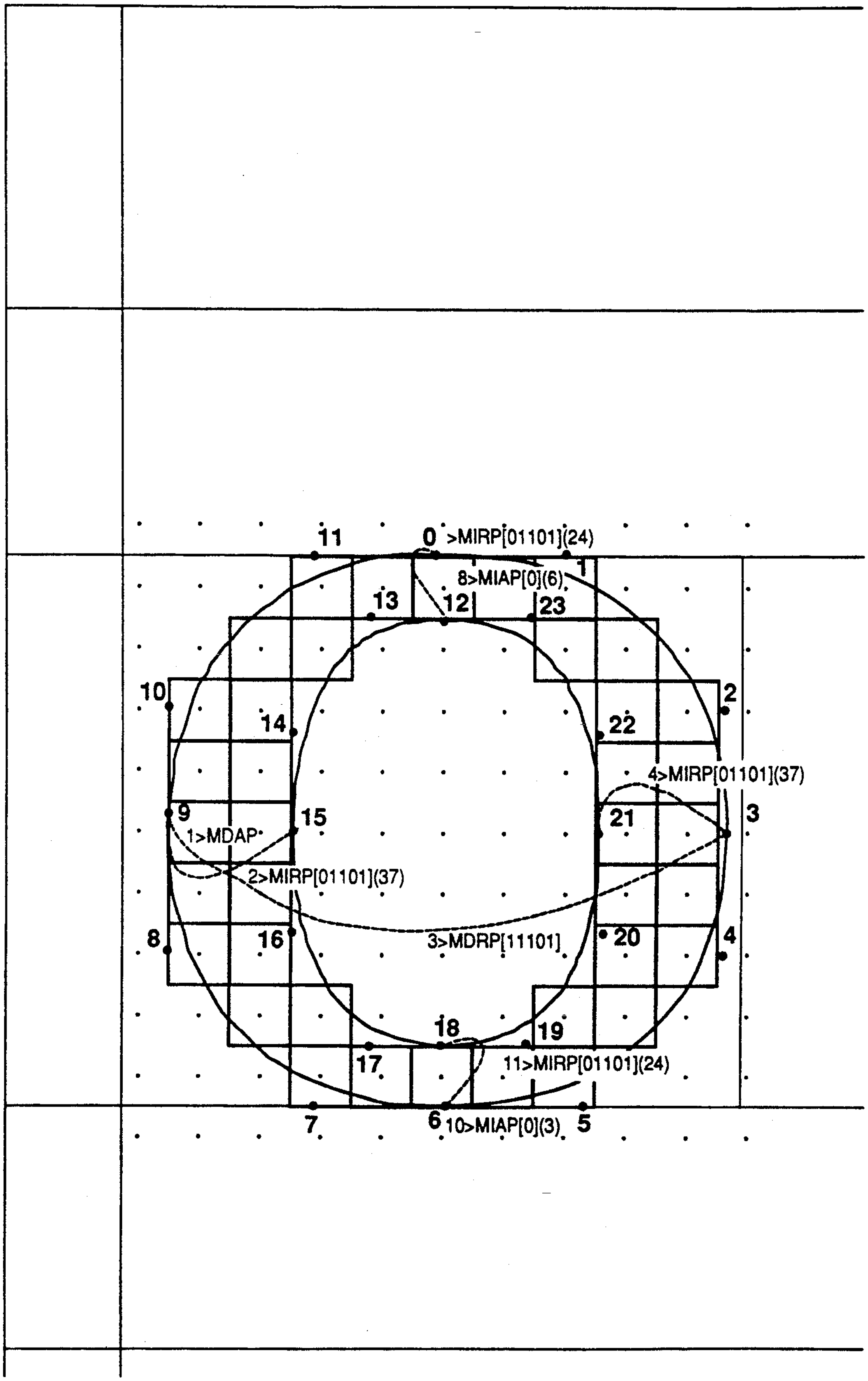
FIG. 9. illustrates an improved resulting bitmap of a character after Delta exceptions have been applied to alter control points and outlines.

FIG. 9 illustrates the results of applying font instructions together with Delta exceptions in improving the resulting bitmap of the lowercase letter "o" at (10×9) dots resolution. As the pixels in the background show, the digital typeface of the lowercase letter "o" is symmetrical and proportional. More importantly, Delta exceptions are capable of moving more than one control point over a range of sizes. As such, user can interactively correct the resulting bitmaps of any glyph over a range of low raster resolutions and in the process build a family of digital typeface better suited for display on low raster output devices.

Figure 10:
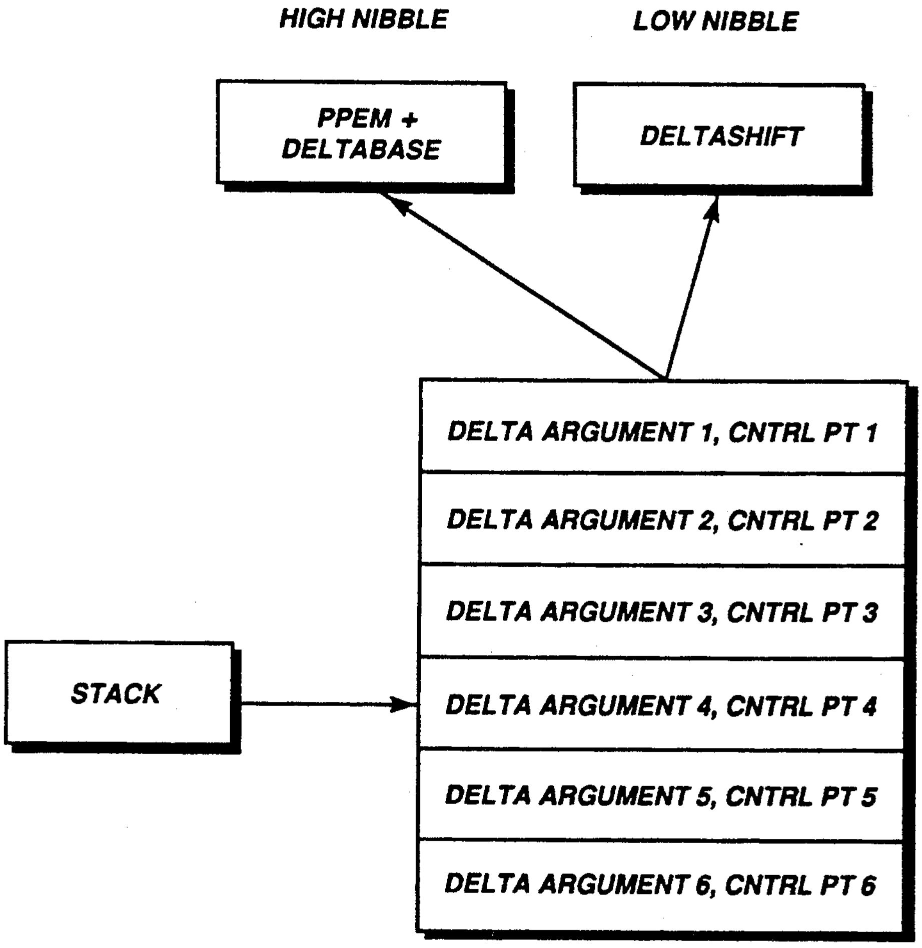
FIG. 10. illustrates data structure of a Delta exception.

The Delta exception takes a variable number of arguments off of the stack and the data structure allows the use of exception of the form: Delta (0) [argument, pt #]. Pt# is the number assigned to a particular control point on an outline. Referring to FIG. 10, the stack has, for instance, six Delta arguments. Each argument has two parts: is 1 byte long, and composed of two parts: a high size nibble storing a size of the glyph the user wishes to work with; a low control point displacement nibble storing the distance Pt# should move along the Projection vector. A Freedom projection vector indicates which direction the user wishes the particular control point to move in. To specify the correct size for the high size nibble, the user must subtract the actual ppem from the deltaBase. DeltaBase is set in the global Graphic State and has a default value of 9. If the user does not change the default value of deltaBase, the lowest resolution Delta Exception which is operative is 9 ppem. Of course, deltaBase may be changed to suit user's needs.

To indicate the correct distance for the low control point displacement nibble, the user is referred to FIG. 11 which shows an internal remapping table for the low control point displacement nibble of the stack. DeltaShift has values between 0–15. Like deltaBase, deltaShift is found in the global Graphic State and the default value is 3. Delta exception moves control points by one or multiple fractions (one over two raised to the power of deltaShift) of a pixel. Determining the correct value for the low nibble requires the user to correlate the desired fraction with the output range divided by 2 raised to the power deltaShift. For instance, if the user would like to move pt# a quarter of a pixel to the right, then the output range value of 2 is appropriate ($2/8=\frac{1}{4}$). Therefore, the corresponding input range is 9—the correct value for the low nibble. Just as deltaBase, deltaShift may take on value other than the default value of 3. Note that it is possible to move any control points by a distance greater than a pixel if deltaShift has a value of less than 3.

Suppose the user wants to move control pt # 15 of our glyph $\frac{1}{8}$ of a pixel along the x-axis at size 12. The high nibble would have a value of $12-9=3$. To specify $\frac{1}{8}$ of a pixel, the output range value of 1 gives us $\frac{1}{8}$ when divided by 2 raised to the power of deltaShift. Hence the corresponding input value of 8 should be stored in the low nibble. Combining high nibble with 3 and low nibble with 8 produces the number 56 (00111000, in binary). As such the Delta exception will have the form Delta (0) 56 1.

As applicable in the concrete example in FIG. 8, the Delta exceptions used in the x-axis operated on the following control points over the indicated range of resolution and moved each control points by one or multiple fractions of given pixels:

| Delta Exception Control Points | | High Nibble | Glyph Size | Low Nibble | Control Point Displacement |
|---|---|---|---|---|---|
| Delta 86 | 1 | 0101 | 14 | 0110 | $-\frac{1}{4}$ Pixel |
| Delta 86 | 5 | 0101 | 14 | 0110 | $-\frac{1}{4}$ |
| Delta 214 | 11 | 1101 | 22 | 0110 | $-\frac{1}{4}$ |
| Delta 217 | 1 | 1101 | 22 | 1001 | $\frac{1}{4}$ |
| Delta 214 | 7 | 1101 | 22 | 0110 | $-\frac{1}{4}$ |
| Delta 217 | 5 | 1101 | 22 | 1001 | $\frac{1}{4}$ |
| Delta 230 | 11 | 1110 | 23 | 0110 | $-\frac{1}{4}$ |
| Delta 233 | 1 | 1110 | 23 | 1001 | $\frac{1}{4}$ |
| Delta 230 | 7 | 1110 | 23 | 0110 | $\frac{1}{4}$ |
| Delta 233 | 5 | 1110 | 23 | 1001 | $\frac{1}{4}$ |
| Delta 242 | 11 | 1111 | 24 | 0010 | $-\frac{3}{4}$ |
| Delta 253 | 1 | 1111 | 24 | 1101 | $\frac{3}{4}$ |
| Delta 242 | 7 | 1111 | 24 | 0010 | $-\frac{3}{4}$ |
| Delta 253 | 5 | 1111 | 24 | 1101 | $\frac{3}{4}$ |

It can be observed from the above that Delta Exceptions permit user of font rendering engines to quickly correct and adjust the outlines of a glyph over a significant range of resolution (9 ppem to 24 ppem). Using Delta exceptions, the applicant has enhanced digital typeface with raster output devices at resolution as low as 72 dpi.

It will be appreciated from the preceding description of a specific application of the method of invention that the method can be used in a variety of application to enhance digital typeface or font data that is capable of providing resulting bitmap at low raster resolution. Moreover, the format of font input data is not restricted to 2nd order B-spline fonts. For instance, any of the outline type formats are suitable as input data for outline enhancement with Delta exceptions. Similarly, the method can be used to produce grid-aligned outlines for output to other output devices.

What is claimed is:

1. A method for manipulating the outline of a symbol image at a plurality of output sizes for improving the display of a digital typeface on raster output device having an output resolution and having an array of pixels, comprising the steps of:

- storing in a first memory means a plurality of control points corresponding to an outline of said symbol image, at least one of said control points having predetermined information specifying different positions of said at least one of said control points for at least two of said plurality of output sizes;
- selecting at least one of said control points of said outline which requires manipulation;
- selecting a first size from said plurality of output sizes to display said outline at said first size on said raster output device;
- calculating a distance and direction for repositioning said selected control point at said first size and said output resolution;
- manipulating said outline by using the distance and direction calculated for said selected control point to reposition said selected control point; and
- storing the results of said outline manipulation in a second memory means.

2. The method as defined by claim 1, wherein said calculated distance and direction comprises a predetermined distance and direction for repositioning said selected control point at said first size and at said output resolution.

3. The method as defined in claim 2, wherein said predetermined distance is a fraction, the denominator of said fraction being 2 raised to the power of a value representing the smallest possible point displacement.

4. A method as in claim 2 further comprising displaying said outline on said raster output device after said outline manipulation such that the display of said outline after said outline manipulation causes the activation of a first plurality of pixels which differ from a second plurality of pixels which results from the display of an outline corresponding to said plurality of control points stored in said first memory means at said first size and said output resolution.

5. The method as defined in claim 1 further including the step of manipulating said outline successively at each of said plurality of output sizes such that a group of control point sets corresponding to each of said plurality of output sizes is formed, thereby specifying a new digital typeface.

6. A computer display system for manipulating the outline of a symbol image at a plurality of output sizes and improving the display of a digital typeface on raster output device having an output resolution and having an array of pixels, said computer display system comprising:

- a first memory means for storing a plurality of control points corresponding to said outline of said symbol image, at least one of said control points having predetermined information specifying different positions of said at least one of said control points for at least two of said plurality of output sizes;
- selecting means coupled to said first memory means for selecting for manipulation at least one of said control points of said outline;
- size means for selecting a first size from said plurality of output sizes to display said outline at said first size on said raster output device;
- distance and direction calculating means for calculating a distance and direction by which said selected control point should be repositioned for said first size and said output resolution said calculating means being coupled to said size means;
- manipulation means for manipulating said outline by using the distance and direction calculated for said selected control point to reposition said selected control point; and
- a second memory means for storing the results of said outline manipulations and outputting said outlines so that symbol image may be displayed on said raster output device.

7. The system as defined by claim 6, wherein said calculated distance and direction comprises a predetermined distance and direction for repositioning said control point at said first size and said output resolution.

8. The system as defined in claim 7, wherein said predetermined distance is a fraction, the denominator of said fraction being 2 raised to the power of a value representing the smallest possible point displacement.

9. The system as defined in claim 6 further including means of successively manipulating said outline successively at each of said plurality of output sizes such that a group of control point sets corresponding to said plurality of output sizes is formed, thereby specifying a new digital typeface.

10. In a computer system having a raster type output device, a method for manipulating the outlines of a symbol image at various different sizes for improving the display of the output device, comprising:

(a) storing a plurality of control points in a memory means of said computer system, a combination of said control points corresponding to an outline of said symbol image;

(b) indicating a size at which said outline requires manipulation in order to provide a close representation of said symbol image on said raster device;

(c) selecting at least one of said control points to be manipulated, said selection being made according to a predetermined criteria;

(d) specifying a distance and direction through which said selected control point should be repositioned;

(e) manipulating said outline by moving said selected control point through said specified displacement so as to place said selected control point in a new location;

(f) repeating each of said steps (d) and (e) for each of said selected control points; and (g) storing the results of said manipulations in said memory means.

11. The method of claim 10, wherein said raster output device comprises a CRT video display.

12. The method of claim 10 wherein said output device displays pixels, and said specified distance is expressed in fractions of a length of a pixel.

* * * * *